T860,008

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 18, 1969

860 O.G. 678

647,320

POLYMER PREPARED BY THE HYDROLYSIS OF AROMATIC POLYIMIDES AND CONVERSION OF THE RESULTING POLYAMIDE-ACID LINKAGES TO FORM AROYLOXYPROPANESULFONATE DYE SITES

Robert Samuel Irwin, Newark, Del., assignor to E. I. du Pont de Nemours and Company, Wilmington, Del., a corporation of Delaware

Filed June 20, 1967. Published Mar. 18, 1969

Class 8—55

No Drawing. 36 Pages Specification

Processes for (1) hydrolysis of imide linkages of aromatic polyimides to corresponding polyamide-acid linkages by reaction with barium hydroxide or strontium hydroxide and (2) conversion of the resultant polyamide-acid linkages to form dyeable aroyloxypropanesulfonate dye sites; and polymers produced by said processes.